Figure 1:
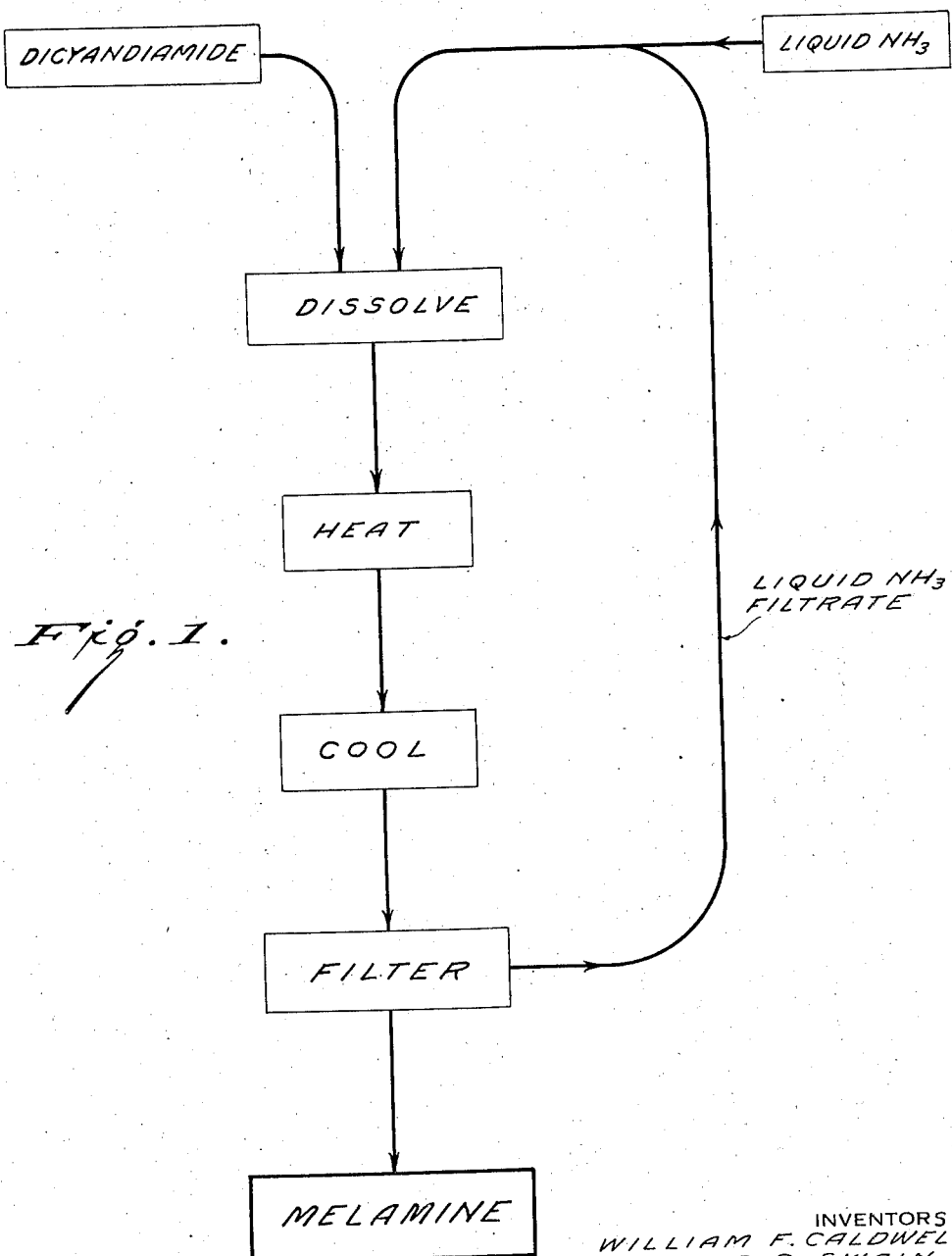

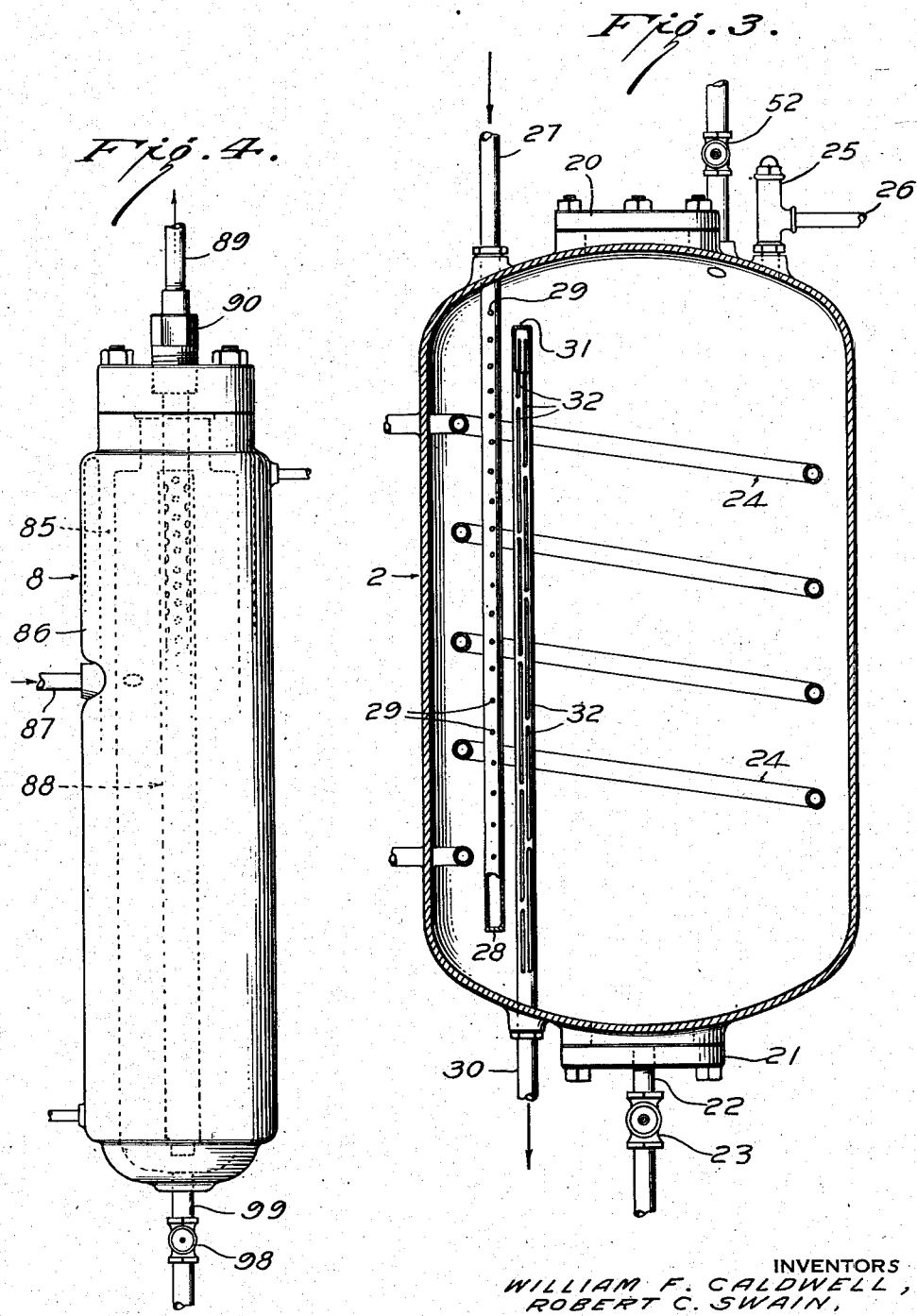

Patented May 8, 1945

2,375,731

UNITED STATES PATENT OFFICE 2,375,731

PROCESS FOR THE PRODUCTION OF MELAMINE

William F. Caldwell, Old Greenwich, Robert C. Swain, Riverside, and Joseph H. Paden, Glenbrook, Conn., assignors to American Cyanamid Company, New York, N. Y., a corporation of Maine Application June 6, 1942, Serial No. 446,158

13 Claims. (Cl. 260—249.5)

This invention relates to the manufacture of melamine and has as one of its principal objects the production of melamine of high purity. Other objects of the invention are to provide an economical method for producing melamine particularly adapted to be carried out in a continuous, or substantially continuous, manner. Still other objects of our invention will appear hereinafter.

It is well known that when cyanamide or dicyandiamide or mixtures thereof are heated with liquid ammonia in an autoclave a reaction occurs resulting in the formation of melamine. This process, while directly producing melamine of considerably greater purity than is obtained by other known processes, nevertheless is subject to a number of disadvantages. We have found, for example, that when equal weights of liquid ammonia and dicyandiamide are heated in an autoclave at 100° C. for 8 hours the yield of melamine is very poor, being generally of the order of about 30% of that theoretically obtainable from the dicyandiamide present. At higher temperatures, of the order of 115-120° C., heating the mixture for three hours will result in the conversion of about 30% of the dicyandiamide to melamine, and heating for ten hours will result in a conversion of only about half of the dicyandiamide to melamine.

From these experimental results it would appear that still higher temperatures must be employed if high yields of melamine are to be obtained in a reasonable period of time when using the autoclave process, and this has proven to be the case. Thus, for example, we found that when equal parts of dicyandiamide and liquid ammonia were heated at 160° C. for two hours in a rocker type autoclave the product obtained analyzed about 97.5% melamine and 1.2% of water-insoluble products, the remainder being mostly unreacted dicyandiamide. These values represent approximately the maximum conversion of dicyandiamide to melamine that can be obtained in liquid ammonia by known processes.

Although the yield of melamine thus obtained is considered good the process as described presents several serious difficulties. One of the principal difficulties lies in the fact that severe caking of the melamine product occurs when high reaction temperatures are used, making it impossible to fully discharge the autoclave. Moreover, since an autoclave of commercial size cannot be cooled between batches in any reasonable time a large part of the ammonia therein vaporizes when the pressure is released, depositing large quantities of melamine as a hard cake which can be removed only with great difficulty. It has also been found that while chemical analysis of the product shows it to be of apparently high purity it nevertheless contains small amounts of unidentified substances which must be removed in order to obtain a product suitable for the production of high grade molding compounds and lacquers. Although we have not been able to isolate and identify all of these impurities they are believed to be alkaline intermediate conversion products of the type of guanidine and biguanide which although water-soluble cannot be completely removed from the caked product by washing. The insoluble matter formed during the reaction is also of unknown composition but is believed to be a mixture of deamination products of melamine such as melam, melem, mellon, etc. which may be formed from melamine or dicyandiamide under the reaction conditions employed.

Some of the aforesaid mechanical difficulties of the autoclave process can be avoided by adding a diluent such as methanol or ethanol to the reaction mixture in the autoclave. The use of methanol in the autoclave tends to reduce the vapor pressure therein and enables the product to be discharged from the autoclave as a slurry thus avoiding the caking difficulties described above. An autoclave charge would in this case consist of approximately 1 part by weight of dicyandiamide, 1 part by weight of liquid ammonia and 1 part by weight of methanol. While this procedure avoids some of the operating difficulties of the process it reduces the capacity of the equipment by approximately one-third, the methanol being apparently an inert material taking no part in the reaction, and does not allow the volume of liquid ammonia to be substantially decreased. The product obtained by this process appears to have the same type of impurities in it that occur without using methanol.

By means of our new process which constitutes the present invention we are able to overcome all of the aforesaid difficulties and obtain melamine of an exceptionally high degree of purity which can be used directly in the production of high grade melamine lacquers and other melamine products. Our process while producing melamine of exceptional purity is nevertheless extremely simple in operation and lends itself well to being adapted to a cyclic process for the continuous production of melamine. Accordingly the process may be operated economically and efficiently, the ultimate conversion of cyanamide or dicyandiamide to melamine being practically complete.

Basically, our process may be illustrated with Figure 1, which is a flow sheet indicating the more essential steps of our new process. Broadly the invention comprises the circulation of liquid ammonia containing dicyandiamide dissolved therein, the formation of melamine by heating the solution, the separation of melamine from its mother liquor and the recycling of the mother liquor in the system while maintaining conditions such that at least the greater part of the material in the system is liquid at all times. Since cyanamide is readily converted to melamine under the conditions of the reaction it too may be used or, if desired, mixtures of cyanamide and dicyandiamide. In order to avoid repetitious use of this terminology we will use the word dicyandiamide hereinafter to broadly include the use of cyanamide or mixtures of dicyandiamide and cyanamide in lieu thereof.

Fig. 1 is a flow sheet of the process.

As will be noted from inspection of Fig. 1 dicyandiamide is dissolved in liquid ammonia. The dicyandiamide is dissolved in the liquid ammonia at temperatures ranging from about 20° C. to 70° C. and is ordinarily dissolved in an equal weight of the ammonia although it will be understood that more or less dicyandiamide may be used; i. e., the dicyandiamide may compose about 25–70% of the whole. Since liquid ammonia vaporizes rapidly at these temperatures it is necessary to keep the solution in the dissolving tank under pressures of approximately 150–300 pounds per square inch.

After dissolving dicyandiamide in the liquid ammonia the solution may then be heated in the same or a different vessel to temperatures within the range 110–160° C., the best results having been obtained within the range 135–150° C. During the heating dicyandiamide, or cyanamide if employed, is converted to melamine. Ammonia, while playing an important role in the conversion, is not used up by the process and can be recovered for reuse.

Heretofore workers in this art have attempted to obtain as high a yield as possible. Such attempts have resulted in the employment of high temperatures for substantial periods of time and the product was therefore contaminated with undesirable by-products which can only be removed by the expensive and time-consuming expedient of recrystallization. These impurities were inherent in the product because it is impossible to make the reaction go completely to the formation of melamine; some dicyandiamide always remaining unconverted and certain intermediate conversion products such as guanidine and biguanide which may be formed during the heating period not being completely converted to the final product. Also, as mentioned previously, high temperatures and lengthy heating periods favor the formation of deamination products such as melam, melem and mellon.

We avoid the formation of many of these products and the contamination of the melamine formed during the reaction by converting only a small part of the dicyandiamide to melamine at this stage of the process. More specifically, we prefer not to convert more than about half of the dicyandiamide to melamine during the reaction period. Actually, we heat the dicyandiamide solution at 110–160° C. for about 10 minutes to 60 minutes, preferably from about 15–25 minutes. During this time under our preferred conditions only about 20% of the dicyandiamide in the ammoniacal liquor is converted to melamine. It is an important feature of our invention that during this reaction period the reaction mass is maintained in liquid form; that is, the ammonia is not allowed to completely vaporize and deposit solid material. Although the critical temperature of liquid ammonia is about 132° C. we have discovered that the effective critical temperature of an ammonia-dicyandiamide solution is much higher, and we are therefore able to work at temperatures as high as 160° C. without excessive vaporization of ammonia by maintaining a large amount of dissolved dicyandiamide in the liquid ammonia at all times. This is one of the most important features of our invention, since it results in maintaining the melamine and other materials in the ammoniacal liquor in solution, or at least suspended in the liquid, and hard deposits on the walls of the apparatus are not formed. Pressures on the order of 1400–3000 pounds per square inch have been found adequate to keep the reaction mass in liquid form; 1700–2000 pounds pressure being employed at our preferred reaction temperatures of 135–150° C.

The ammoniacal liquor containing melamine, unconverted dicyandiamide and possibly small amounts of intermediate conversion products is then cooled whereby the melamine contained therein is precipitated out of its mother liquor in the form of fine crystals. This cooling step may likewise take place in the same vessel, although as will appear hereinafter we prefer to cool the liquor in a separate vessel, fitted with an agitator. Cooling the liquor to 10–30° C., preferably 15–20° C., will cause the separation from the mother liquor of all but about 2% of the melamine contained therein. Of great importance in the production of high purity melamine is the fact that the dicyandiamide and the alkaline intermediate conversion products previously mentioned are very soluble in liquid ammonia and do not crystallize out at these temperatures. Accordingly the cooled liquor containing precipitated melamine may be filtered and washed free from dicyandiamide and the intermediate conversion products with pure liquid ammonia. Since comparatively low temperatures are employed for a short period of time during the reaction the product is found to be practically free of the undesirable deamination products formed at higher temperatures in the autoclave process.

The ammoniacal mother liquor leaving the filter contains a large percentage, 25–45% or so, of unconverted dicyandiamide and small amounts of unprecipitated melamine and other intermediate products and is returned to the dissolving vessel with the addition, if necessary, of liquid ammonia to make up mechanical losses. Additional dicyandiamide is then dissolved in the mother liquor to bring its concentration up to the desired starting concentration and the process is repeated.

From the foregoing it will be seen that while we obtain a conversion of not more than about half of the dicyandiamide to melamine in each passage of the solution through the system the unreacted dicyandiamide is recycled and is eventually converted with an almost quantitative yield into melamine. The intermediate conversion products which were ordinarily present in the autoclave product and which could not be entirely removed are avoided completely by our new process since they are not taken out of the system with the melamine. On the other hand, they remain in the mother liquor and are eventually converted into melamine. This is a definite saving of material which heretofore has been wasted and has caused considerable trouble in the product or additional expense for its removal.

Although our process may be readily carried out in conventional reaction vessels fitted with heating and cooling means and adapted to withstand the high pressures developed during the process it is particularly adapted to be operated continuously in specially designed apparatus. It is necessary, however, if the full advantages of our improved process is to be obtained that the equipment be so designed as to keep the solutions in liquid form throughout the reaction. As will appear obvious from what has been said vaporization of the liquor will cause formation of hard deposits of melamine contaminated with dicyandiamide and undesirable intermediate conversion products. With this in view we have designed an apparatus particularly suited for the carrying out of our new process continuously whereby the solutions are maintained under pressure sufficiently great to keep them in a liquid condition. Our invention will now be described in conjunction therewith. Since this apparatus may be employed for the continuous production of materials other than melamine by other processes it forms the subject matter of our copending application, Serial No. 446,156, filed June 6, 1942, and is described and claimed more specifically therein.

Figure 2:
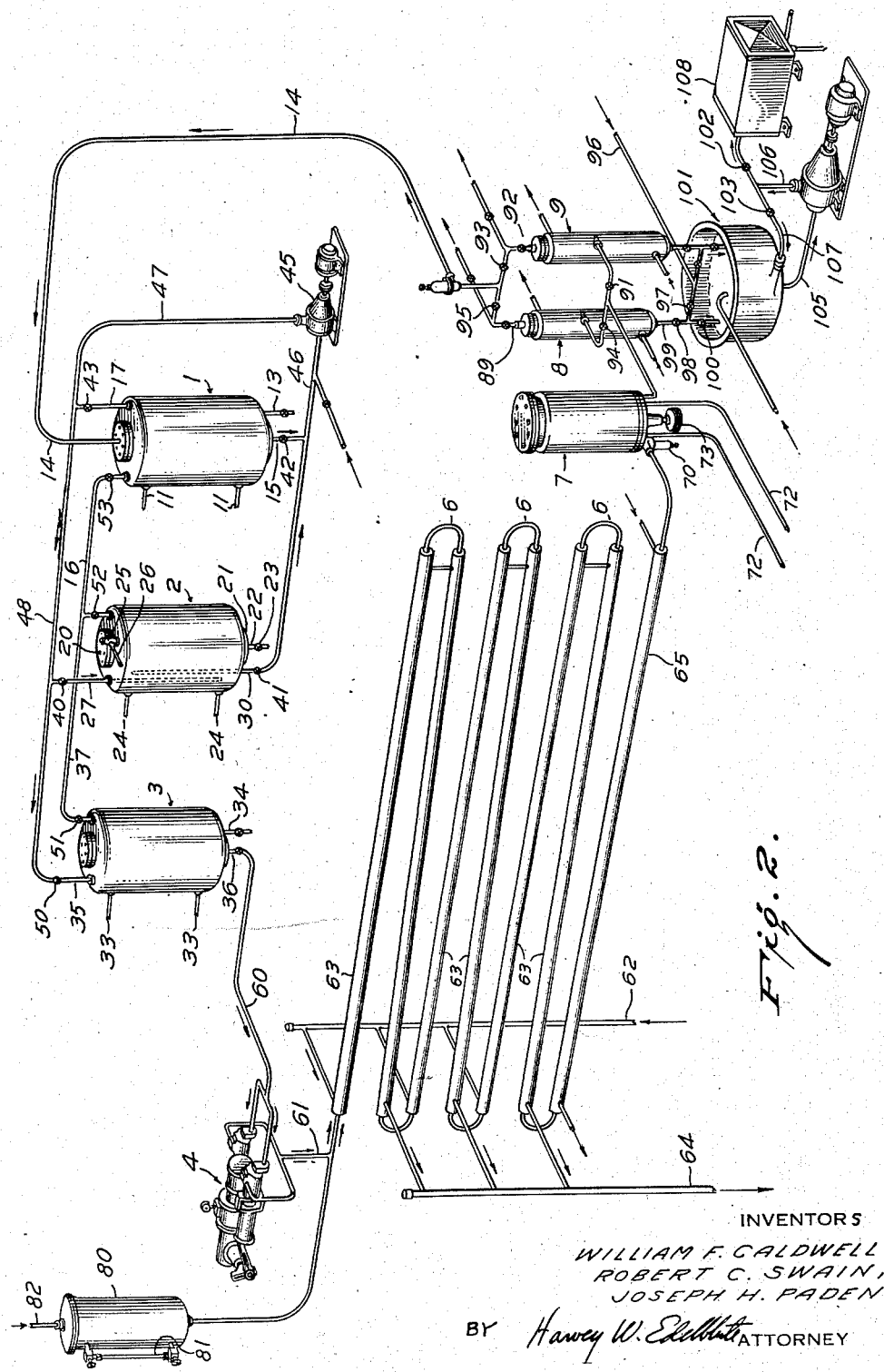

Referring again to the drawings,

Fig. 2 is a perspective view of apparatus particularly suited for carrying out our new process as herein described;

Fig. 3 is an elevational view with parts cut away showing details of the dissolver shown in Fig. 2. Since this apparatus is new and embodies novel and useful features it is described and claimed more particularly in the application of one of us, W. F. Caldwell, Serial No. 446,157, filed June 6, 1942.

Fig. 4 is an elevational view with parts cut away showing structural details of the filter employed in the apparatus shown in Fig. 2. This particular filter is also new and possesses novel and useful features and is described and claimed more specifically in the copending application of one of us, W. F. Caldwell, Serial No. 446,159, filed June 6, 1942.

Referring now to Fig. 2, there is shown a mother liquor tank 1, a dissolver 2, a storage tank 3, high pressure pump 4, reaction tubes 6, cooling tank 7 and filters 8 and 9 which parts include the most essential features of the apparatus to be described. The mother liquor tank 1 is simply a closed pressure vessel of stainless steel, or other strong corrosion-resistant material, and is fitted with heating or cooling coils 11, sampling tube 13, inlet line 14, outlet line 15, pressure equalizing line 16 and circulating line 17. As will appear hereinafter this tank serves the principal function of holding the mother liquor recycled from the process.

The dissolver 2 is shown in detail in Fig. 3 and reference is made thereto. This vessel is constructed of strong corrosion-resistant material and is also adapted to be operated under pressure. It is fitted with an easily removable cover 20 which can be taken off to permit the introduction of dicyandiamide. A similar closure 21 may be provided at the lower end of the tank and fitted with a drain pipe 22 and valve 23 which permits cleaning of the vessel when desired. A heating coil 24 may be fitted in the tank as indicated. A relief valve 25 is also provided with an outlet 26 to some point removed from the operating zone. This valve may be set to relieve the pressure in the tank at whatever pressure deemed necessary by the operator. Ammoniacal liquor may be introduced into the tank through inlet pipe 27 which is closed at its end 28 and has a number of openings 29 cut in such a way that the ammoniacal liquor passing therethrough leaves the openings substantially tangential with the walls of the dissolver. An outlet line 30 is positioned alongside the inlet pipe and consists of a closed pipe 31 with perforations 32 therein allowing the liquor to pass through but holding the undissolved dicyandiamide in the tank. If desired, the outlet pipe may be wrapped with filter cloth of cotton, glass or stainless steel to provide more efficient screening.

The storage tank 3 is simply a pressure vessel of corrosion-resistant material with heating coils 33, sampling line 34, inlet line 35, outlet line 36, and pressure equalizing line 37. The function of this vessel is to hold a body of ammoniacal dicyandiamide solution so that the process may be operated continuously while another batch of solution is being prepared in the dissolver and mother liquor tank.

Preparation of the ammoniacal dicyandiamide solution will now be described. With all valves closed the cover 20 of the dissolver is removed and a weighed quantity of dicyandiamide is added to the vessel. The cover is then tightly closed and valves 40, 41 opened. Valve 42 of the mother liquor tank, which contains a quantity of mother liquor or liquid ammonia, is opened and valve 43 is partly opened. Circulating pump 45 is then started and ammoniacal liquor withdrawn from the mother liquor tank through valve 42, and line 46, and pumped through lines 47, 48, valve 40 and line 27 into the dissolver. As the liquor is forced through the openings 29 (Fig. 3) of the inlet tube in the dissolver it is given a circular motion. The swirling liquor in the tank dissolves part of the dicyandiamide and leaves through outlet line 30. The circulation of ammoniacal liquor through the dissolver is maintained until a sample of liquor withdrawn from the system shows that it contains sufficient dicyandiamide for the purpose, that is from about 25–70% dicyandiamide on the total weight of the liquor. In order to handle a larger volume of liquor, valve 43 is partially opened as previously mentioned, and part of the circulating liquor returns to the mother liquor tank through line 17 where it mixes with the mother liquor contained therein. When the liquor has been built up to a desired concentration of dicyandiamide, valve 40 is closed and the liquor remaining in the dissolver is pumped into the mother liquor tank. Valve 41 may then be closed and the cover of the dissolver removed and an additional charge of dicyandiamide added.

A desired amount of the liquor in the mother liquor tank may now be pumped into the storage tank by closing valve 43 and opening valve 50. A pressure equalizing line 16, 37 with suitably positioned valves 51, 52 and 53 is provided in the system to equalize the pressures between the various tanks, thus facilitating discharge of liquor from one to the other as desired. Sight glasses (not shown) may of course be provided on each of the tanks to indicate the level of the liquid contents therein.

Having thus obtained an ammoniacal solution of dicyandiamide of desired strength the solution is withdrawn through line 60, to the high pressure pump 4 which forces the solution through line 61 and the reaction tubes 6. The reaction tubes may consist simply of stainless steel pipes forming a reaction zone in which the conversion to melamine occurs. The pipes may be heated by steam or Dowtherm vapors flowing through header 62 into jackets 63 surrounding the reaction tubes. The condensate may be removed through header 64 as shown. The size and length of the pipes forming the reaction zone are dependent upon the capacity of the apparatus and should be of sufficient volume to allow the ammoniacal liquor to remain in the reaction tubes at operating temperatures for a period of time ranging from 10 to 60 minutes; 15–25 minutes having been found to be desirable. During the passage of the liquor through the tubes melamine is formed therein but as previously stated it is maintained in a dispersed condition. The terms "liquid," "liquid form" and "liquid condition," as applied to the material undergoing reaction in the process of our invention, is intended to define a condition wherein there is sufficient ammonia or ammonia-dicyandiamide solution present as a liquid phase to entrain any melamine crystals that may separate from solution. A section of the tubing provided with a cooling jacket 65 may in some cases be desirable.

After passing through the reaction tubes the liquor is discharged through a relief valve 70 directly into a cooling vessel 7. The particular cooling vessel shown is simply a pressure autoclave fitted with cooling coils 72 and a powerful agitator 73. The degree of cooling in the cooling vessel should be sufficient to cause the crystallization from solution of most of the melamine in the ammoniacal liquor without causing the precipitation of dicyandiamide or the alkaline intermediate conversion products previously mentioned. Temperatures ranging from 10 to about 30° C., preferably 15–20° C. have been found suitable for this purpose. The pressure in the cooling tank may range from about 200 to 600 pounds per square inch.

As the pressure in the cooling tank is considerably lower than the pressure in the reaction tubes failure of the relief valve to close would result in a decrease of pressure in the reaction zone with vaporization of the ammoniacal liquor. Should this happen melamine would deposit in the tubes and might prevent further circulation of liquor therethrough. To avoid this possibility we maintain a body of ammoniacal liquor in vessel 80. Ordinarily the vessel is kept about half full of ammonia liquid with an overlying body of nitrogen or other inert gas, the relative amounts of which may be determined by means of a sight glass 81. Nitrogen gas may be supplied as required through line 82. Should the relief valve remain open for a period of time longer than is necessary to relieve the pressure in the reaction tubes the inert gas over the body of ammoniacal liquor in vessel 80 will force this liquor into the reaction zone at a pressure sufficiently high to prevent vaporization of ammonia therein. Accordingly it will be seen that this arrangement is of importance in maintaining continuous flow of liquor through the reaction zone. This system also has the further function of acting as a surge tank in absorbing hydraulic impulses transmitted to the liquor by the reciprocating high pressure pump 4.

The melamine crystals formed in the ammoniacal liquor upon cooling are removed from their mother liquor by filtration in one of the specially designed filters 8, 9 shown in detail in Fig. 4. Referring to Fig. 4 it will be seen that the filter consists essentially of a strongly built elongated vessel 85, fitted with a cooling jacket 86 through which water or other cooling liquid may circulate. The mother liquor with suspended melamine therein enters the filter through line 87 tangentially as shown. Inside the filter is axially positioned a filtering element comprising a perforated pipe 88 covered with 14 mesh stainless steel screen which is in turn covered with filter cloth. One end of the outlet pipe is closed as shown. Liquor flowing through inlet line 87 is given a swirling motion in the filter which tends to throw the particles of melamine to the outer walls of the filter away from the filtering screen thus decreasing the tendency of the filter cake to build up on the filtering element. The liquor passes through the filter cloth into the pipe 88 and out into line 89 and is then returned to the mother liquor tank for reuse through line 14. A suitable packing assembly 90 is provided so that the filtering element may be taken out for occasional inspection.

When the filter 8 is filled with melamine, which may be determined by noting the difference in pressures between the outlet and inlet sides thereof, the adjoining filter 9 of similar construction may be placed in action by opening valves 91, 92 and 93 and closing valves 94 and 95. The melamine in the filter may be washed with liquid ammonia by forcing liquid ammonia through line 96, valves 97 and 98 and line 99 into the filter. Liquid ammonia passes through the filter cake and out through line 89. The wash liquor may be collected in a separate vessel or may be added to the liquid in the mother liquor tank as make-up ammonia.

The washed melamine may then be discharged from the filter by merely opening valves 98 and 100. Opening of the filter to the atmosphere releases the pressure on the ammonia in the filter cake causing it to vaporize and blow out of the filter carrying with it the melamine crystals. We have found that while the amount of ammonia in the melamine filter cake is relatively small it is nevertheless sufficient to thoroughly disintegrate the cake and force it from the filter. When the filter 9 is filled the flow of mother liquor with its melamine is changed back to the filter 8 and the filter cake in filter 9 is washed and the melamine discharged by operation of the corresponding valves as just described.

The melamine discharged from the filter is recovered in tank 101 which should be covered and fitted with an exhaust fan to remove obnoxious ammonia fumes. This tank is ordinarily maintained about half full of water into which the melamine is discharged. After the melamine has been blown into the water valve 102 is closed, valve 103 is opened and circulating pump 104 is placed in operation. As shown in the drawings, the aqueous slurry of melamine is withdrawn from the discharge tank through line 105 and is forced through the line 106 and 107 tangentially with respect to the discharge tank. The swirling motion thus created throughly washes the melamine with the water contained in the tank. After a few minutes valve 102 is opened, valve 103 is closed and the pump forces the melamine slurry to filter press 108. The melamine filter cake may then be washed with water and discharged, and dried.

The product thus obtained is of an extremely high purity, a sample containing, for example 99.8% melamine and only 0.04% of water-insoluble materials. Being made up of fine crystals it grinds easily and dissolves quickly in formaldehyde solutions. The product can be used directly in the production of haze-free lacquers as it comes from the drier without necessity of further purification. These results confirm completely the theoretical considerations previously discussed with respect to the elimination of alkaline intermediate conversion products, deamination products, unreacted dicyandiamide and other undesirable constituents found in melamine produced by other processes.

Although we have described our new process specifically with reference to particular apparatus it will be apparent that modifications may be made both in the apparatus employed and the process steps described without departing from the scope of our invention. The process may be conducted in conventional pressure apparatus by the batch method or continuously, or substantially continuously, by making suitable modifications in available equipment. Also, while we prefer to employ anhydrous ammonia, our new process may be operated with a small percentage of water present although a less pure product is obtained. It can also be operated with the addition of alcohols, etc. to reduce the tendency of deposits of melamine to form in the system. It is therefore understood that the term "liquid ammonia" does not exclude the presence of alcohols or small amounts of water. Accordingly, we wish it to be understood that we regard our invention as being of broad scope and limited only by the appended claims.

What we claim is:

1. A process for the manufacture of melamine which includes the steps of heating at temperatures within the range 110° C. to 160° C. for not more than one hour a member of the group consisting of cyanamide, dicyandiamide and mixtures thereof in liquid ammonia until not more than about one-half thereof has been converted to melamine, cooling the resulting solution, separating the precipitated melamine from its mother liquor and thereafter recycling the mother liquor with additional quantities of a member of the said group consisting of cyanamide, dicyandiamide and mixtures thereof, pressure being maintained at all times to keep the system in liquid phase and to prevent any substantial vaporization of the ammonia.

2. A process for the manufacture of melamine which includes the steps of heating dicyandiamide in liquid ammonia until a part not more than about one-half, of the dicyandiamide has been converted to melamine, cooling the resulting solution, separating the precipitated melamine from its mother liquor and thereafter recycling the mother liquor with additional quantities of dicyandiamide, pressure being maintained at all times to keep the system in liquid phase and to precent any substantial vaporization of the ammonia.

3. A process for the manufacture of melamine which includes the steps of dissolving dicyandiamide in liquid ammonia, heating the solution at temperatures between 110° C. and 160° C. until a part, not more than about one-half, of the dicyandiamide has been converted to melamine, cooling the resulting solution, separating the precipitated melamine from its mother liquor and thereafter recycling the mother liquor with additional quantities of dicyandiamide, pressure being maintained at all times to keep the system in liquid phase and to prevent any substantial vaporization of the ammonia.

4. A process for the manufacture of melamine which includes the steps of dissolving dicyandiamide in liquid ammonia, heating the solution until a part, not more than about one-half, of the dicyandiamide has been converted to melamine while maintaining the reaction mixture in liquid condition, cooling the resulting solution to precipitate melamine, separating the precipitated melamine from its mother liquor and thereafter recycling the mother liquor with additional quantities of dicyandiamide and liquid ammonia added thereto, pressure being maintained at all times to keep the system in liquid phase and to prevent any substantial vaporization of the ammonia.

5. A process for the manufacture of melamine which includes the steps of heating dicyandiamide dissolved in liquid ammonia at temperatures within the range 110–160° C. for 15–60 minutes whereby a part not more than about one-half, of the dicyandiamide is converted to melamine, cooling the resulting solution, separating the precipitated melamine from its mother liquor and thereafter recycling the mother liquor with additional quantities of dicyandiamide, pressure being maintained at all times to keep the system in liquid phase and to prevent any substantial vaporization of the ammonia.

6. A process for the manufacture of melamine which includes the steps of dissolving dicyandiamide in liquid ammonia, heating the solution at about 135–150° C. for 20–25 minutes whereby a part not more than about one-half, of the dicyandiamide is converted to melamine, cooling the resulting solution, separating the precipitated melamine from its mother liquor and thereafter recycling the mother liquor with additional quantities of dicyandiamide, pressure being maintained at all times to keep the system in liquid phase and to prevent any substantial vaporization of the ammonia.

7. A process for the manufacture of melamine which includes the steps of heating dicyandiamide dissolved in liquid ammonia until not more than about half of the dicyandiamide has been converted to melamine, cooling the resulting solution to about 10–30° C. to precipitate melamine, separating the precipitated melamine from its mother liquor and thereafter recycling the mother liquor with additional quantities of dicyandiamide, pressure being maintained at all times to keep the system in liquid phase and to prevent any substantial vaporization of the ammonia.

8. A process for the manufacture of melamine which includes the steps of dissolving dicyandiamide in liquid ammonia, heating the solution until a part not more than about one-half, of the dicyandiamide has been converted to melamine, cooling the resulting solution to about 15–20° C. to precipitate melamine, separating the precipitated melamine from its mother liquor and thereafter recycling the mother liquor with additional quantities of dicyandiamide, pressure being maintained at all times to keep the system in liquid phase and to prevent any substantial vaporization of the ammonia.

9. A process for the manufacture of melamine which includes the steps of preparing a solution of dicyandiamide in liquid ammonia containing from about 25% to about 70% of dicyandiamide, heating the solution at a temperature of at least 110° C. until not more than about half of the dicyandiamide has been converted to melamine, cooling the resulting solution to precipitate most of the melamine while at the same time retaining the unreacted dicyandiamide in solution, separating the precipitated melamine from its mother liquor and thereafter recycling the mother liquor with additional quantities of dicyandiamide, pressure being maintained at all times to keep the system in liquid phase and to prevent any substantial vaporization of the ammonia.

10. A process for the manufacture of melamine which includes the steps of dissolving dicyandiamide in liquid ammonia to form a solution containing 25–70% of dicyandiamide, heating the solution at temperatures within the range 110–160° C. under a pressure of from 1400 to 3000 pounds per square inch for 15 to 60 minutes whereby a part, not more than about one-half of the dicyandiamide is converted to melamine, the reaction mixture meanwhile being maintained in a liquid condition, cooling the resulting solution to precipitate most of the melamine but insufficiently to precipitate dicyandiamide from the mother liquor, recovering melamine from the mother liquor and thereafter dissolving additional quantities of dicyandiamide in said mother liquor and recycling the same, pressure being maintained at all times to keep the system in liquid phase and to prevent any substantial vaporization of the ammonia.

11. A process for the manufacture of melamine which includes the steps of dissolving a member of the group consisting of cyanamide, dicyandiamide and mixtures thereof in liquid ammonia, heating the solution at temperatures within the range 110–160° C. under pressures sufficient to maintain the reaction mixture in liquid form for 15–60 minutes whereby melamine is formed therein with a yield of not more than about 50%, discharging the resulting material through a pressure relieving means into a zone of lower pressure and cooling to precipitate most of the melamine, separating the precipitated melamine from its mother liquor and recycling the said mother liquor in the process, pressure being maintained at all times to keep the system in liquid phase and to prevent any substantial vaporization of the ammonia.

12. In the process of producing melamine in which a solution of dicyandiamide in liquid ammonia is heated until not more than about one-half of the dicyandiamide is converted to melamine and in which the said melamine is precipitated from its mother liquor by cooling thereof and the mother liquor is recycled with added amounts of dicyandiamide, pressure being maintained at all times to keep the system in liquid phase and to prevent any substantial vaporization of the ammonia, the improvement which comprises discharging said liquor through pressure-reducing means directly into a cooling zone maintained at a lower pressure but sufficient to maintain the discharged liquor in liquid form.

13. In the process of producing melamine in which a solution of dicyandiamide in liquid ammonia is heated until not more than about one-half of the dicyandiamide is converted to melamine and in which the said melamine is precipitated from its mother liquor by cooling thereof and the mother liquor is recycled with added amounts of dicyandiamide, pressure being maintained at all times to keep the system in liquid phase and to prevent any substantial vaporization of the ammonia, the improvement which comprises maintaining a body of the liquid reaction solution at the pressure of the ammoniacal liquor in the said reaction zone and in liquid communication therewith whereby accidental lowering of the pressure in the reaction zone through withdrawal of excess amounts of liquor therefrom with resulting vaporization of the liquor is prevented.

WILLIAM F. CALDWELL.
ROBERT C. SWAIN.
JOSEPH H. PADEN.